US010161637B2

(12) United States Patent
Kamii

(10) Patent No.: US 10,161,637 B2
(45) Date of Patent: Dec. 25, 2018

(54) HEATING COOKER

(71) Applicant: Yasuhiko Kamii, Osaka (JP)

(72) Inventor: Yasuhiko Kamii, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 547 days.

(21) Appl. No.: 14/353,866

(22) PCT Filed: Oct. 24, 2012

(86) PCT No.: PCT/JP2012/077467
§ 371 (c)(1),
(2) Date: Apr. 24, 2014

(87) PCT Pub. No.: WO2013/062001
PCT Pub. Date: May 2, 2013

(65) Prior Publication Data
US 2014/0305320 A1 Oct. 16, 2014

(30) Foreign Application Priority Data
Oct. 28, 2011 (JP) ................................ 2011-237504

(51) Int. Cl.
*A21B 1/48* (2006.01)
*H05B 6/64* (2006.01)
(Continued)

(52) U.S. Cl.
CPC .............. *F24C 7/02* (2013.01); *F24C 15/006* (2013.01); *H05B 6/642* (2013.01); *H05B 6/6411* (2013.01); *H05B 6/6429* (2013.01)

(58) Field of Classification Search
CPC ........ F24C 15/006; F24C 7/02; H05B 6/6411; H05B 6/642; H05B 6/6429
(Continued)

(56) References Cited

U.S. PATENT DOCUMENTS 3,512,514 A * 5/1970 Vonasch .................. F24C 14/02 126/21 A
4,108,139 A * 8/1978 Gilliom ................. F24C 15/006 126/21 A (Continued)

FOREIGN PATENT DOCUMENTS

FR 2935779 A1 * 3/2010 ............ F24C 15/006
JP 57-153906 9/1982

(Continued)

OTHER PUBLICATIONS

JP_08195280_A_translation.pdf.*

(Continued)

*Primary Examiner* — Dana Ross
*Assistant Examiner* — Ket D Dang
(74) *Attorney, Agent, or Firm* — Birch, Stewart, Kolasch & Birch, LLP

(57) ABSTRACT

A heating cooker includes a heating chamber provided within a casing, a turntable placed at a bottom of the heating chamber, a turntable motor for driving the turntable to rotate, the turntable motor being placed below the heating chamber and below the casing, and a cooling fan for circulating air, taken in from a front side of the casing, through a space between a lower face of the casing and a bottom face of the built-in storage unit to supply the air into the casing, in a state that the casing is mounted within the built-in storage unit. Thus, a heating cooker capable of effectively cooling the turntable motor at a low cost with a simple configuration.

10 Claims, 5 Drawing Sheets

(51) Int. Cl.

| | |
|---|---|
| ***F24B 3/00*** | (2006.01) |
| ***F24C 7/02*** | (2006.01) |
| ***F24C 15/00*** | (2006.01) |

(58) Field of Classification Search

USPC ....... 219/757, 756, 754, 762, 623, 385, 392, 219/393; 126/39 B, 39 C, 37 R, 39 R, 30; 99/450, 484, 357, 340, 443 R

See application file for complete search history.

(56) References Cited

U.S. PATENT DOCUMENTS

| | | | | | |
|---|---|---|---|---|---|
| 4,354,084 | A * | 10/1982 | Husslein | F24C 15/006 | 126/21 A |
| 4,375,213 | A * | 3/1983 | Kemp | F24C 14/025 | 126/21 A |
| 5,477,036 | A * | 12/1995 | Jun | H05B 6/642 | 126/21 A |
| 5,747,781 | A * | 5/1998 | Kim | H05B 6/6482 | 219/404 |
| 5,892,209 | A * | 4/1999 | Choi | H05B 6/6411 | 219/754 |
| 5,945,024 | A * | 8/1999 | Fukunaga | H05B 6/642 | 219/757 |
| 6,864,472 | B2 * | 3/2005 | Kang | H05B 6/6429 | 126/21 A |
| 2004/0094541 | A1 * | 5/2004 | Lee | H05B 6/642 | 219/679 |
| 2005/0236402 | A1 * | 10/2005 | Christiaansen | H05B 6/6485 | 219/681 |
| 2005/0236409 | A1 * | 10/2005 | Cho | H05B 6/6411 | 219/757 |
| 2007/0131220 | A1 * | 6/2007 | Kim | F24C 15/02 | 126/273 R |
| 2010/0199966 | A1 * | 8/2010 | Iwamoto | H05B 6/642 | 126/21 R |
| 2010/0303985 | A1 * | 12/2010 | De' Longhi | A47J 43/046 | 426/438 |

FOREIGN PATENT DOCUMENTS

| | | | |
|---|---|---|---|
| JP | 63-201427 | A | 8/1988 |
| JP | 01179823 | A * | 7/1989 |
| JP | 06074470 | A * | 3/1994 |
| JP | 08195280 | A * | 7/1996 |
| JP | 2001-41462 | A | 2/2001 |
| JP | 2002-267179 | A | 9/2002 |

OTHER PUBLICATIONS

English translation for JP_06074470 A.*

International Search Report, issued in PCT/JP2012/077467, dated, Nov. 20, 2012.

* cited by examiner

HEATING COOKER

TECHNICAL FIELD

The present invention relates to a heating cooker and more particularly, to a heating cooker having a turntable within a heating chamber.

BACKGROUND ART

A conventional heating cooker has a heating chamber within a casing, and a turntable placed at a bottom of the heating chamber (see, for example, JP 2001-41462 (PTL1)). In the heating cooker, the turntable, which is placed within the heating chamber, is driven to rotate by a turntable motor which is placed within the casing and below the heating chamber.

The heating cooker has the following problems. That is, temperatures around the turntable motor, which is placed between the bottom of the heating chamber and the bottom of the casing, are raised by heat coming from the heating chamber. Therefore, countermeasures against heat such as use of a heat resistant motor, use of additional ducts for cooling the motor, and/or the like have to be taken. This increases costs.

CITATION LIST

Patent Literature

PTL1: JP 2001-41462 A

SUMMARY OF INVENTION

Technical Problem

The present invention aims at providing a heating cooker which is able to effectively cool a turntable motor by a simple structure and hence at a low cost.

Solution to Problem

A heating cooker according to an aspect of the present invention includes:

- a casing mountable within a built-in storage unit;
- a heating chamber provided within the casing and having an opening at a front side thereof;
- a turntable placed at a bottom of the heating chamber;
- a turntable motor arranged and configured to drive the turntable to rotate, the turntable motor being placed below the heating chamber and below the casing; and
- a cooling fan arranged and configured such that in a state that the casing is mounted within the built-in storage unit, the cooling fan circulates air, taken in from a front side of the casing, through a space between a lower face of the casing and a bottom face of the built-in storage unit to supply the air into the casing.

The built-in storage unit may be a recess provided below a top plate of a so-called system kitchen and having a front opening (i.e., an opening on a front side of the system kitchen) or a box type storage unit having an opening on its front side.

With the above arrangement, in a state that the casing is mounted within the built-in storage unit having the front opening, at least a part of air taken in from the front side of the casing by the cooling fan is supplied through a space between the lower face of the casing and the bottom face of the built-in storage unit into the casing. The air taken in by the cooling fan and circulating through the space between the lower face of the casing and the bottom face of the built-in storage unit cools the turntable motor placed below the heating chamber and below the casing. The heating cooker of this embodiment allows for use of a less expensive versatile motor, without requiring use of a high temperature resistant motor or use of additional cooling ducts. Therefore, the present invention allows for effective cooling of the turntable motor without use of a high temperature resistant motor or use of additional cooling ducts, but with a simple structure and hence at a low cost.

In an embodiment, the cooling fan is placed on a back side of the casing and, in the state that the casing is mounted within the built-in storage unit, supplies the air, taken in from the front side of the casing, through the space between the lower face of the casing and the bottom face of the built-in storage unit and then a space between a back face of the casing and a back face of the built-in storage unit into the casing.

According to the above embodiment, in the state that the casing is mounted within the built-in storage unit, at least some of air taken in from the front side of the casing by the cooling fan provided on the back side of the casing is circulated through the space between the lower face of the casing and the bottom face of the built-in storage unit into the space between the back face of the casing and the back face of the built-in storage unit. Then, the air is sucked by the cooling fan and supplied into the casing. In this way, the spaces between the casing and walls of the built-in storage unit are utilized to supply air, after the air cools the turntable motor, into the casing to cool heat generation parts in the casing. Thus, the cooling fan is used both for cooling the turntable motor and for cooling such heat generation parts in the casing.

In an embodiment, the heating cooker further includes a guide cover provided at a bottom of the casing so as to cover the turntable motor, and configured to guide the air, taken in from the front side of the casing, toward the back face of the casing.

According to the above embodiment, the guide cover, which is provided at the bottom of the casing so as to cover the turntable motor, protects the turntable motor and also smoothly guides or directs some of air, taken in from the front side of the casing by the cooling fan, toward the back face of the casing after the air has been used to cool the turntable motor.

In an embodiment, air supplied into the casing by the cooling fan passes through the casing and is discharged forward through an exhaust port provided at the front side of the casing.

According to the above embodiment, air supplied into the casing by the cooling fan passes through the casing and is discharged forward through the exhaust port provided at the front side of the casing. Thus, even in a state that the casing is mounted, or housed within the built-in storage unit, an air passage is established from take-in to discharge of the air by the cooling air to thereby provide a smooth air flow. Thus, a cooling efficiency is improved.

Advantageous Effects of Invention

As is apparent from the above, according to the present invention, it is possible to achieve a heating cooker which is able to effectively cool a turntable motor by a simple structure and hence at a low cost.

DESCRIPTION OF EMBODIMENTS

The heating cooker of the present invention will be described below by way of an embodiment shown in the attached figures.

Figure 1:
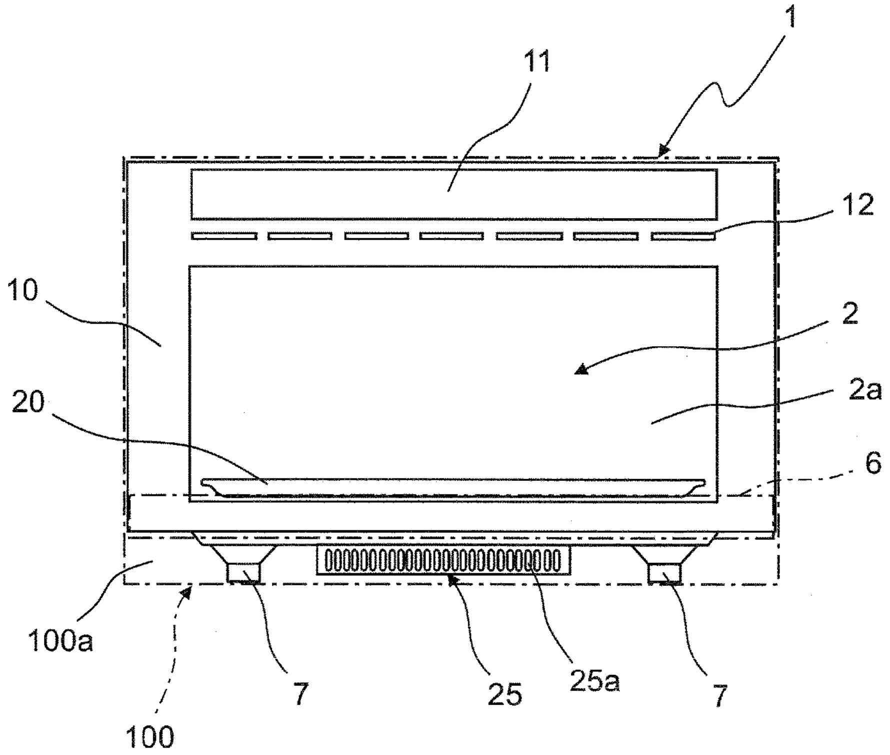
FIG. 1 is a front view of a heating cooker according to an embodiment of the present invention.

FIG. 1 shows a front view of a heating cooker according to an embodiment of the present invention.

This heating cooker has, as shown in FIG. 1, a metal casing 1 of a rectangular parallelepiped shape, a heating chamber 2 provided within the casing 1 and having an opening 2*a*, and a door 6 pivotable, or swingable, about near a lower edge of a front panel 10 of the casing 1. The casing 1 is provided with four legs 7 at its bottom and a guide cover 25 at a central part of the bottom. The guide cover 25 has a plurality of slits on its front side, as well as on its back side although not shown in the figure.

The front panel 10 has, above the opening 2*a* of the heating chamber 2, a display and operation section 11 including a display part and operation buttons. The front panel 10 also has an exhaust port 12 between the opening 2*a* of the heating chamber and the display and operation section 11. The exhaust port 12 includes a plurality of slits arranged transversely in one line. The exhaust port 12 is arranged and configured such that it is not closed by the door 6 when the door 6 is closed. A turntable 20 is provided at the bottom of the heating chamber 2, with the turntable 20 rotatably supported.

The heating cooker is mounted within a built-in storage unit 100 having a front opening 100*a*.

Figure 2:
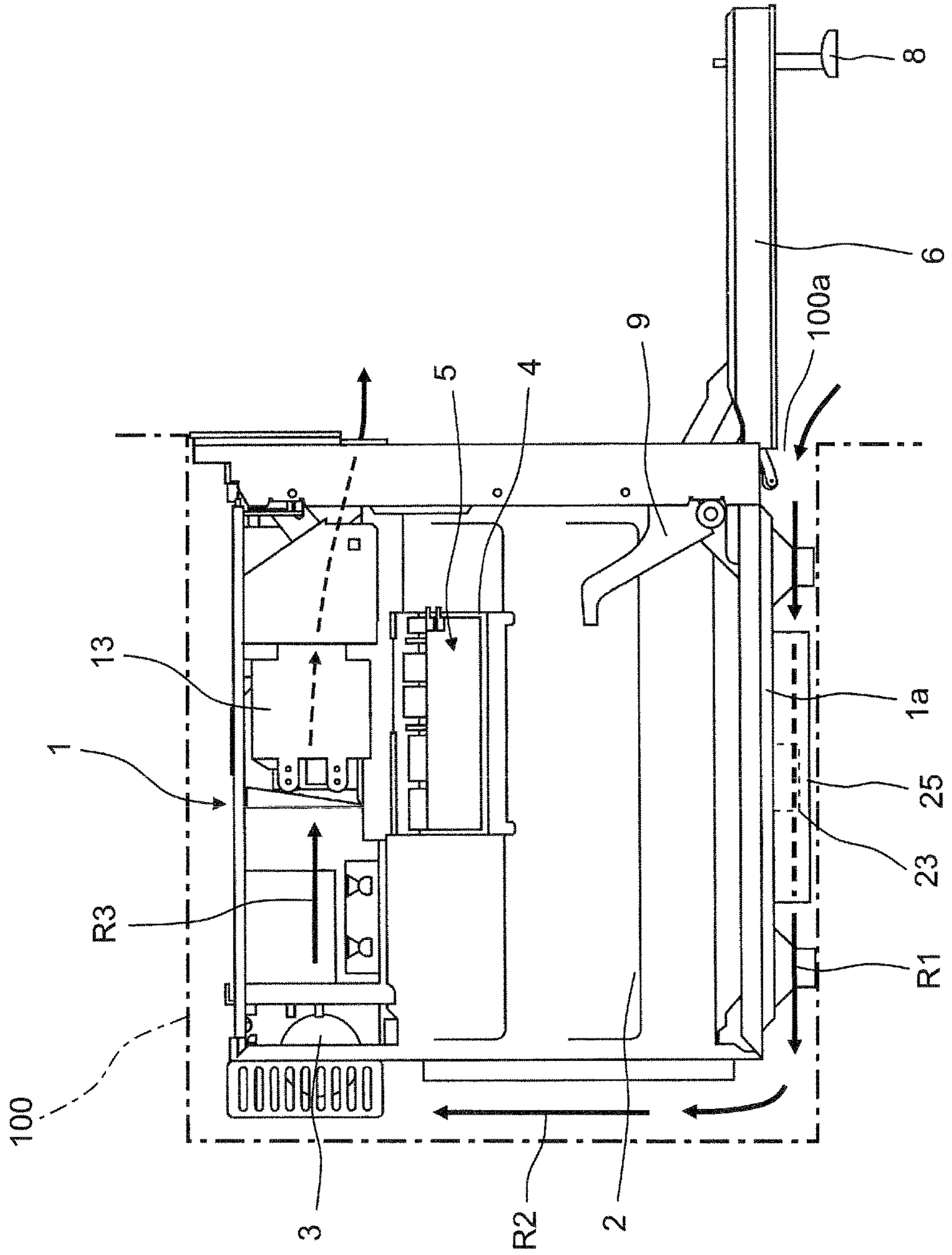
FIG. 2 is a left side view of the heating cooker.

FIG. 2 shows a left side view of the heating cooker. In FIG. 2, the heating cooker is shown with a top plate and a side plate of the casing 1 removed and with the door 6 being fully open. In FIG. 2, reference numeral 23 indicates a turntable motor.

As shown in FIG. 2, a cooling fan 3 is placed on a back side of the casing 1. The cooling fan 3 functions to take in air from the front side of the casing 1 and circulates the air through a space between a lower face of the casing 1 and a bottom face of the built-in storage unit 100 and then a space between a back face of the casing 1 and a back face of the built-in storage unit 100 into the casing 1, as indicated by arrows R1 and R2.

Figure 3:
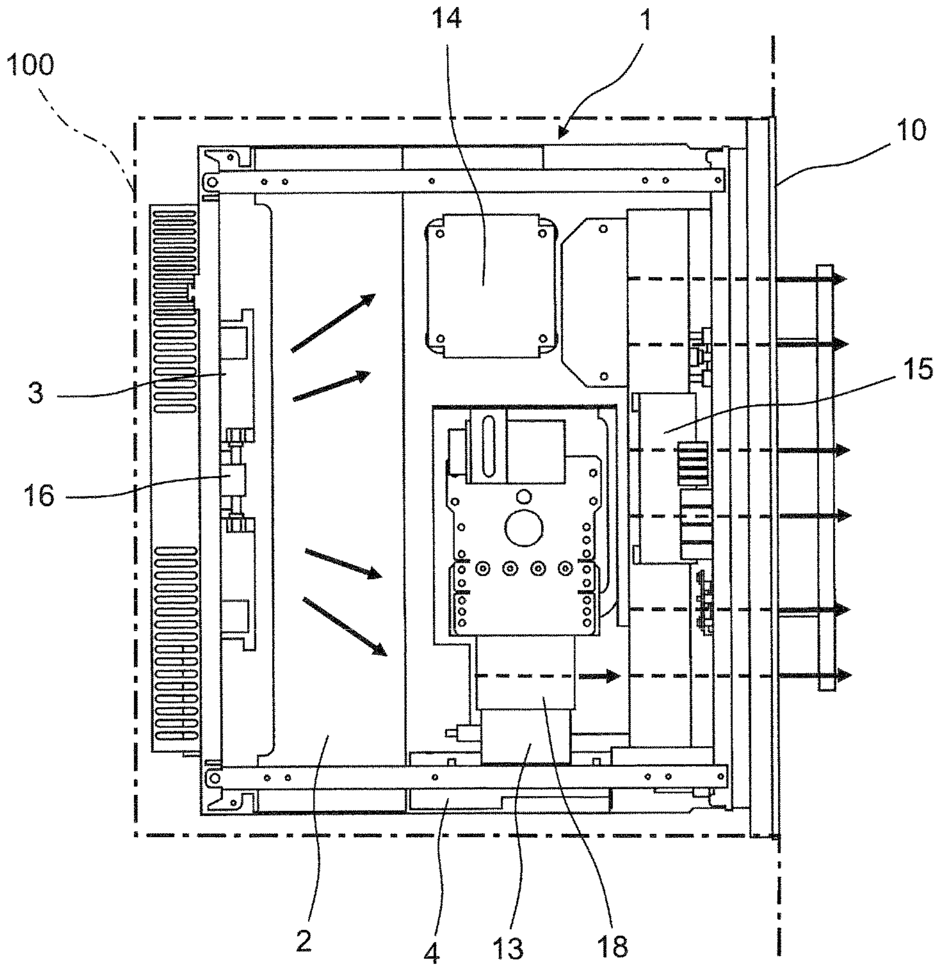
FIG. 3 is a top view of the heating cooker.

Air blown from the cooling fan 3 in the direction of arrow R3 into the casing 1 flows around a magnetron 13, a high voltage transformer 14 (shown in FIG. 3), and a control unit (shown in FIG. 3), and goes out of the casing 1 through the exhaust port 12 (shown in FIG. 3).

The heating cooker also has a holder 4 made of metal or resin and a board 5 supported by the holder 4. The holder 4 is placed on an upper left side of the heating chamber 2 as viewed from the door 6 side. The board 5 is mounted with things such as a lamp for illuminating the inside of the heating chamber.

The door 6 has a handle 8 for opening and closing the door 6 at an upper part thereof. A lower part of the door 6 is connected with a front part of a bottom plate 1*a* of the casing 1 through a cam mechanism 9 such that when closing the door 6, a spring member (not shown) constituting a part of the cam mechanism 9 urges the door 6 to its closed position.

FIG. 3 shows a top view of the heating cooker. In FIG. 3, the heating cooker is shown with the top plate and the side plates of the casing 1 removed and with the door 6 fully closed.

The magnetron 13, the high voltage transformer 14 and the control unit 15 are arranged in a space between a top face of the casing 1 and a top face of the heating chamber 2 such that air blown from the cooling fan 3 cools the magnetron 13, the high voltage transformer 14 and the control unit 15. Microwave produced by the magnetron 13 is guided by a waveguide 18 to an upper central part of the heating chamber 2, at which part the microwave is stirred by an antenna (not shown) and radiated toward a lower part of the heating chamber 2 to thereby heat an object to be cooked.

The cooling fan 3 is driven by a cooling fan motor 16 placed within the casing 1 on the back side of the heating cooker. A plurality of air regulating plates (not shown) are provided between the cooling fan 3 and the devices such as the magnetron 13, high voltage transformer 14 and control unit 15 such that air blown from the cooling fan 3 is uniformly applied to these devices.

The air blown from the cooling fan 3 is eventually discharged through the exhaust port 12 (shown in FIG. 1) provided at the front panel 10.

Figure 4:
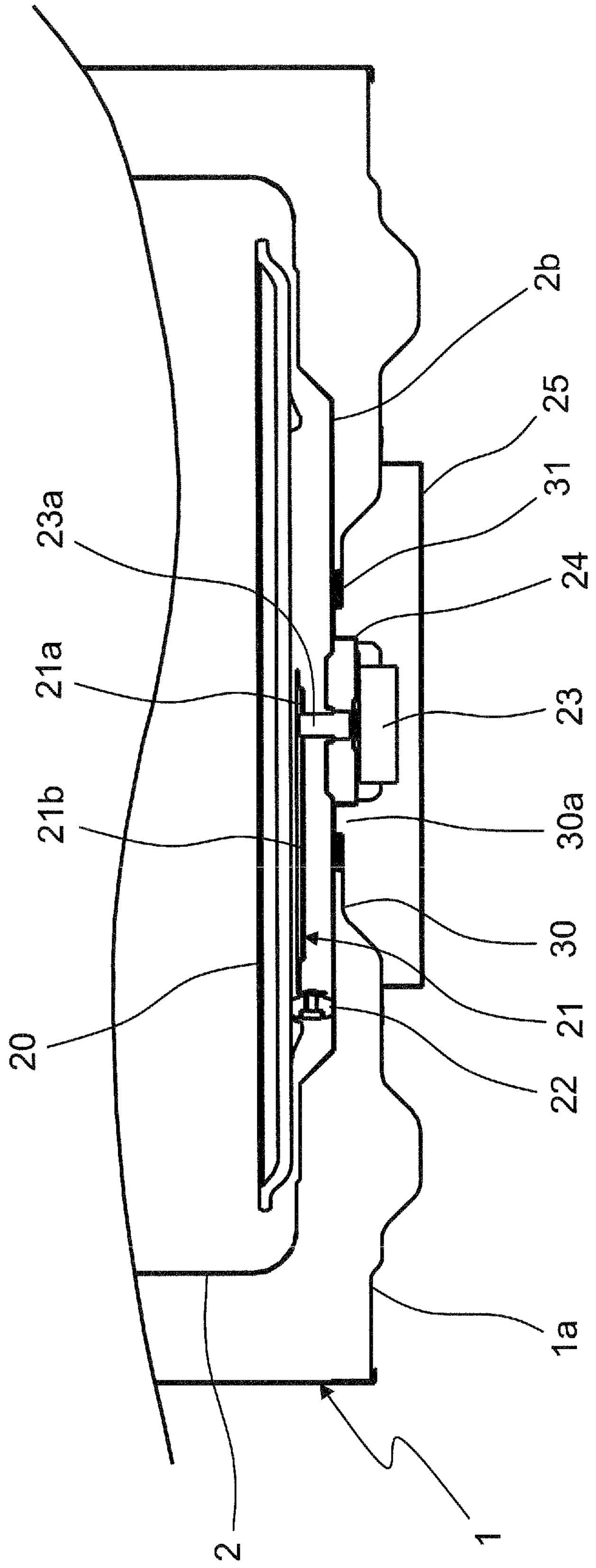
FIG. 4 is a vertical sectional view of an essential part of the heating cooker.

FIG. 4 shows a vertical cross sectional view of an essential lower part of the heating cooker. As is shown in this figure, the turntable 20 placed at the bottom of the heating chamber 2 is rotatably supported by a roller stay 21. The roller stay 21 has a plurality of extending parts 21*b* that extend from a central part 21*a* radially outward such that extremities of the extending parts are circumferentially spaced at equal intervals from each other. The roller stay 21 also has a plurality of rollers 22 attached to the extremities of the extending parts 21*b*.

An end of a driving shaft 23*a* of the turntable motor 23 placed below the heating chamber 2 is fixed to the central part 21*a* of the roller stay 21. The driving shaft 23*a* of the turntable motor 23 passes through a bottom plate 2*b* of the heating chamber 2. The turntable motor 23 is fixed to the bottom plate 2*b* of the heating chamber 2 through a motor mount plate 24. The bottom plate 1*a* of the casing 1 is recessed upward to define a recess 30, and the recess 30 has a hole 30*a* at a center thereof. The turntable motor 23 and a part of the motor mount plate 24 extend downwards through the central hole 30*a* of the recess 30. In this way, the turntable motor 23 is arranged below the heating chamber 2 and also below the casing 1. A heat resistant rubber packing 31 is provided between an edge of the hole 30*a* at the bottom plate 1*a* of the casing 1 and the bottom plate 2*b* of the heating chamber 2.

The guide cover 25 is mounted to the bottom plate 1*a* of the casing 1 in such a manner that the guide cover 25 covers the recess 30 at the bottom plate 1*a* of the casing 1 and the turntable motor 23. The guide cover 25, in this embodiment, has a box shape having an upper opening. But, such a shape is not limitative and the guide cover 25 may have any other shape as far as the shape allows the guide cover 25 to protect the turntable motor as well as to smoothly guide or direct some of air, taken in from the front side of the casing by the cooling fan, toward the back face of the casing after the air has been used to cool the turntable motor.

In the heating cooker with the above arrangement, in a state that the casing 1 is mounted within the built-in storage unit 100 having the front opening 100*a*, as shown in FIG. 2, some or all of air taken in from the front side of the casing 1 by the cooling fan 3 is supplied through a space between the bottom plate 1*a* of the casing 1 and the bottom face of the built-in storage unit 100 into the casing 1. The air taken in by the cooling fan 3 and circulating through the space between the bottom plate 1*a* of the casing 1 and the bottom of the built-in storage unit 100 cools the turntable motor 23 placed below the heating chamber 2 and below the casing 1.

Figure 5:
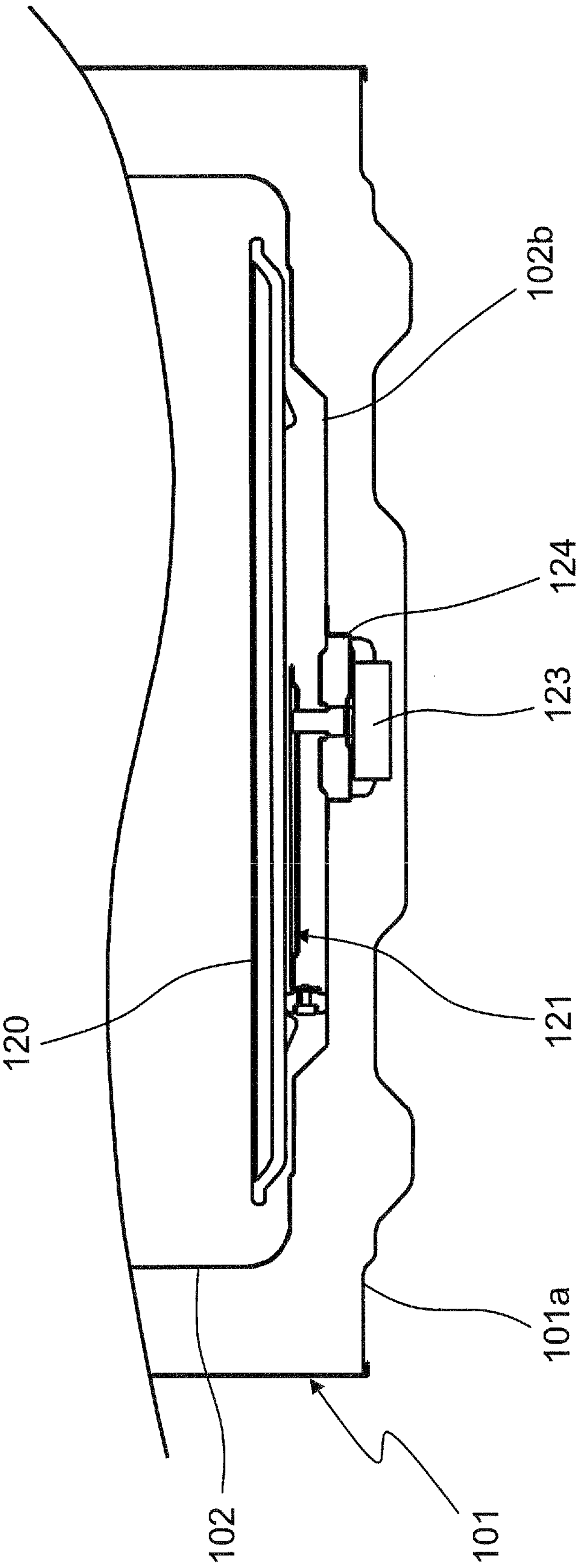
FIG. 5 is a vertical sectional view of an essential part of a conventional heating cooker.

In contrast, in the conventional heating cooker, a vertical cross sectional view of an essential part of which is shown in FIG. 5, a turntable motor 123 is placed within a casing 101 and between a bottom plate 102*b* of a heating chamber 102 and a bottom plate 101*a* of the casing 101. Therefore, it is necessary to take countermeasures against heat such as use of a high temperature resistant motor for the turntable motor 123 and/or use of an additional duct for cooling the turntable motor 123. In FIG. 5, reference numeral 120 indicates a turntable, 121 indicates a roller stay, and 124 indicates a motor mount plate.

The heating cooker of this embodiment allows for use of a less expensive versatile motor, without requiring use of a high temperature resistant motor or use of additional cooling ducts. Also, the heating cooker of this embodiment allows for the effective cooling of the turntable motor 23 to provide improved reliability of the turntable motor 23 with use of a simple structure and hence at a low cost.

Also, in the state in which the casing 1 is mounted within the built-in storage unit 100, some of air taken in from the front side of the casing 1 by the cooling fan 3, which is provided on the backside of the casing 1, is circulated through a space between the lower face of the casing 1 and the bottom face of the built-in storage unit 100 into a space between the back face of the casing 1 and the back face of the built-in storage unit 100. Then, the air is sucked by the cooling fan 3 and supplied into the casing 1. In this way, the spaces between the casing 1 and walls of the built-in storage unit 100 are utilized to supply air, after the air cools the turntable motor 23, into the casing 1 to cool heat generation parts in the casing 1. Thus, the cooling fan 3 is used both for cooling the turntable motor 23 and for cooling the heat generation parts in the casing 1.

The guide cover 25 attached to the bottom of the casing 1 so as to cover the turntable motor 23 serves to protect the turntable motor 23. In addition, the guide cover 25 serves to smoothly guide toward the back face of the casing a part of air taken in from the front side of the casing 1 by the cooling fan 3 after the part of air is used to cool the turntable motor 23.

Air supplied into the casing 1 by the cooling fan 3 passes through the casing 1 and is discharged forward through the exhaust port 12 provided at the front side of the casing 1. Thus, even in a state that the casing 1 is mounted within the built-in storage unit 100, an air passage is established from take-in to discharge of the air by the cooling air 3 to thereby provide a smooth air flow. Thus, a cooling efficiency is improved.

The above embodiment has described the heating cooker housed in the built-in storage unit 100. The present invention is, however, applicable to a heating cooker which is to be housed in a dedicated storage box serving as a built-in storage unit.

Although the above has described a concrete embodiment of the present invention, it should be understood that the present invention is not limited to the described embodiment, but that various changes and modifications can be done within the scope of the present invention.

REFERENCE SIGNS LIST

1 casing
2 heating chamber
2*a* opening
3 cooling fan
4 holder
5 board
6 door
7 leg
10 front panel
11 display and operation section
12 exhaust port
13 magnetron
14 high voltage transformer
15 control unit
16 cooling fan motor
18 waveguide
20 turntable
21 roller stay
22 roller
23 turntable motor
24 motor mount plate
25 guide cover
100 built-in storage unit
100*a* opening

The invention claimed is:

1. A heating cooker comprising:

a casing mountable within a built-in storage unit;

a heating chamber provided within the casing and having an opening at a front of the heating cooker;

a turntable placed at a bottom of the heating chamber;

a turntable motor arranged and configured to drive the turntable to rotate, the turntable motor being attached to a motor mount plate and placed below the heating chamber and below the casing;

a cooling fan arranged and configured such that in a state that the casing is mounted within the built-in storage unit, the cooling fan directs air, taken in from a front side of the casing, into a space between a lower face of the casing and a bottom face of the built-in storage unit to cool the turntable motor before directing the air into the casing; and a guide cover including a plurality of openings at the front side of the heating cooker, the guide cover being provided at a bottom plate of the casing so as to cover the turntable motor, and configured to guide the air, taken in via the openings in the guide cover from the front side of the casing, toward a back side of the casing, and the bottom plate of the casing being recessed upward to define a recess in which the motor mount plate and the turntable motor are placed, with a part of the turntable motor projecting downwards out of the recess.

2. The heating cooker according to claim 1, wherein the cooling fan is placed on the back side of the casing and, in the state that the casing is mounted within the built-in storage unit, supplies the air, taken in from the front side of the casing, through the space between the lower face of the casing and the bottom face of the built-in storage unit and then a space between the back side of the casing and a back face of the built-in storage unit into the casing.

3. The heating cooker according to claim 1, wherein the air supplied into the casing by the cooling fan passes through the casing and is discharged forward through an exhaust port provided at the front side of the casing.

4. A heating cooker comprising:

a casing mounted within a built-in storage unit;

a heating chamber provided within the casing and having an opening at a front of the heating cooker;

a turntable placed at a bottom of the heating chamber;

a turntable motor arranged and configured to drive the turntable to rotate; the turntable motor being attached to a motor mount plate and placed below the heating chamber and below and outside of the casing;

at least one air inlet below the front side of the heating cooker;

a cooling fan arranged to draw air into said air inlet below the front side of the heating cooker, said air being directed through a space between a lower face of the casing and a bottom face of the built-in storage unit to cool the turntable motor before directing the air into the casing; and a guide cover including a plurality of openings at the front side of the heating cooker, the guide cover being provided at a bottom of the casing so as to cover the turntable motor, and configured to guide the air, taken in via the openings in the guide cover from the front side of the heating cooker, toward a back face of the casing, and the bottom plate of the casing being recessed upward to define a recess in which the motor mount plate and the turntable motor are placed, with a part of the turntable motor projecting downwards out of the recess.

5. The heating cooker according to claim 4, wherein the cooling fan is placed on a back side of the casing; and the air is taken in from the front side of the casing, through the space between the lower face of the casing and the bottom face of the built-in storage unit, then through a space between the back side of the casing and a back face of the built-in storage unit, and then into the casing.

6. The heating cooker according to claim 4, wherein the air supplied into the casing by the cooling fan passes through the casing and is discharged forward through an exhaust port provided at the front side of the casing.

7. A heating cooker mountable within a built-in storage unit, comprising:

a single heating chamber having an opening at a front side thereof;

a casing that houses the single heating chamber therein and defines an outer periphery of the heating cooker, a door to open and close the opening of the single heating chamber being connected to the casing;

a turntable placed at a bottom of the single heating chamber;

a turntable motor attached to a motor mount plate and placed below the casing;

a cooling fan placed between the single heating chamber and the casing such that in a state that the heating cooker having the single heating chamber is mounted within the built-in storage unit, the cooling fan directs air, taken in from a front side of the casing, into a space between a lower face of the casing and a bottom face of the built-in storage unit to cool the turntable motor before directing the air into the casing; and a guide cover including a plurality of openings at the front side of the single heating chamber, the guide cover being provided at a bottom plate of the casing so as to cover the turntable motor, and configured to guide the air, taken in via the openings in the guide cover from the front side of the casing, toward a back side of the casing, and the bottom plate of the casing being recessed upward to define a recess in which the motor mount plate and the turntable motor are placed, with a part of the turntable motor projecting downwards out of the recess.

8. The heating cooker according to claim 7, wherein the cooling fan is placed on the back side of the casing and, in the state that the casing is mounted within the built-in storage unit, supplies the air, taken in from the front side of the casing, through the space between the lower face of the casing and the bottom face of the built-in storage unit and then a space between the back side of the casing and a back face of the built-in storage unit into the casing.

9. The heating cooker according to claim 8, wherein the cooling fan is placed in a position corresponding to a laterally central position of the heating chamber.

10. The heating cooker according to claim 7, wherein the air directed into the casing by the cooling fan passes through the casing and is discharged forward through an exhaust port provided at the front side of the casing.

* * * * *